Dec. 13, 1960 J. MONTAGNON 2,964,052
APPARATUS FOR ADDING A CHEMICAL TO A LIQUID
Filed March 26, 1957 3 Sheets-Sheet 1

INVENTOR
Jean Montagnon
By Bailey, Stephens & Huettig
Attorneys

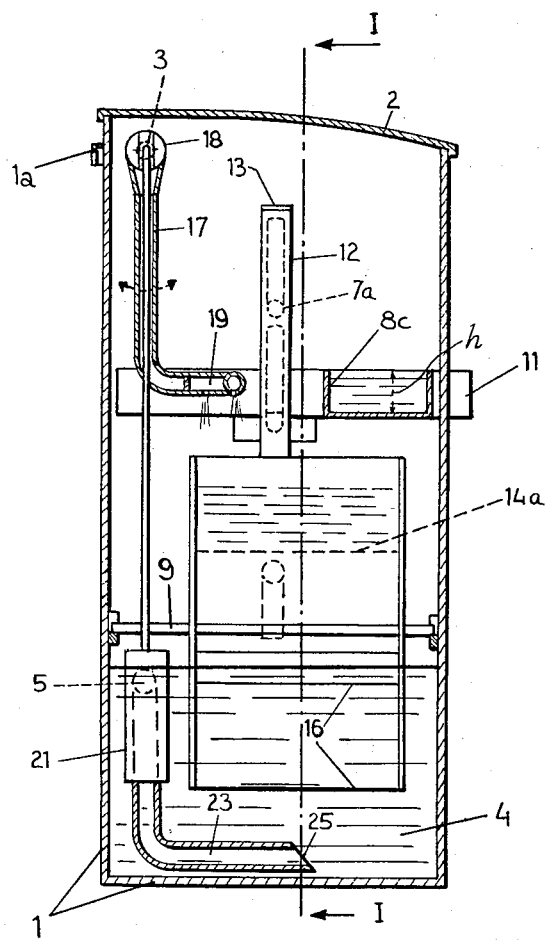

Dec. 13, 1960   J. MONTAGNON   2,964,052
APPARATUS FOR ADDING A CHEMICAL TO A LIQUID
Filed March 26, 1957   3 Sheets-Sheet 3

INVENTOR
Jean Montagnon

By Bailey, Stephens & Huettig
Attorneys

United States Patent Office 2,964,052
Patented Dec. 13, 1960

2,964,052

APPARATUS FOR ADDING A CHEMICAL TO A LIQUID

Jean Montagnon, La-Celle-Saint-Cloud, France, assignor to Societe Nouvelle Pica, Paris, France, a company of France Filed Mar. 26, 1957, Ser. No. 648,604

Claims priority, application France Mar. 29, 1956

8 Claims. (Cl. 137—99.5)

The present invention has for its object apparatus for producing and/or distributing a mixture of at least one chemical substance with a stream of liquid. Said main stream of liquid may be of a permanent or only occasional or intermittent type. Among the different applications of the mixtures which it may be desired to produce in this manner, it is believed that the most interesting is that relating to the treatment and disinfection of water chiefly through sterilization, the throughput of water to be treated being of any type as required on a domestic, industrial or city scale.

Apparatus and arrangements for producing such mixtures are already known per se chiefly as concerns the measuring out of bleaching water in running water. Some of the known apparatus include a rocking member which ensures a measuring to a certain, generally somewhat rough extent of the throughput of the liquid to be treated, said rocking member providing at each oscillation for the incorporation of a predetermined amount of bleaching water or of a measured amount of chemical substances. Such apparatus and arrangements are described in particular in the French Patent 721,156 of August 8, 1931, and in the French Patent 1,087,765 of August 2, 1953.

However, these apparatus and arrangements which are known per se leave room for much improvement and the present invention has chiefly for its object the provision of such apparatus and arrangements which answer more readily than hitherto various practical requirements, in particular as concerns their rational execution and their rational utilization and also as concerns the accuracy and reliability provided as to the result of the treatment to which the main stream is subjected, and finally as concerns the allowed range of adjustment.

The apparatus, according to my invention, is characterized chiefly by the fact that it includes inside the same chamber at least three of the following systems: a system adjusting the input of the main liquid as a function of the output required for said apparatus, a rocking system measuring the amounts of chemical substance or substances and incorporating one or more arrangements for modifying said amounts, a system carrying a provision of the chemical substances adapted to form the mixture inside a container which may be filled through an opening in the chamber, a vat system inside which the desired mixture is collected and a system for removing said mixture out of last mentioned vat system and associated with means ensuring a minimum time of sojourn of said mixture in the vat before removal for use.

Preferably said chamber and a substantial fraction of the parts enclosed within it are made of a synthetic resin which cannot be attacked or is attacked only to a reduced extent by the chemical substances used and by the liquid undergoing treatment. It is also of advantage to increase the rigidity of the apparatus both at the start and during its entire life by cutting out as much as possible all pivotal connections inside it; in particular the rocking system may be established as a rigid member except for the rocking spindle or the like which is preferably made also of a synthetic resin.

Preferably also, the rocking member of the apparatus is rigid with at least one blade, vane or the like extension so as to ensure at each rocking a stirring of the liquid undergoing treatment through admixture with the chemical substances while ensuring at the same time a damping of the rocking movement.

It is also advantageous to provide for a regulation of the level of the provision from which the treated liquid or mixture is tapped off so as to maintain same between a minimum and a maximum value, separate safety means being also possibly provided in addition to such regulating means, respectively for limiting and preventing the tapping off of the treated liquid mixture, if the level is lower than a predetermined minimum, and for preventing through an overflow system any rising above the maximum level.

According to a still further feature of my invention, means are provided for varying the proportions of the mixture obtained.

The invention will be better understood through the reading of the following description referring to the accompanying drawings, wherein:

Fig. 2 is a vertical cross-section perpendicular to that of Fig. 1, through line II—II of Fig. 1.

Figure 1:
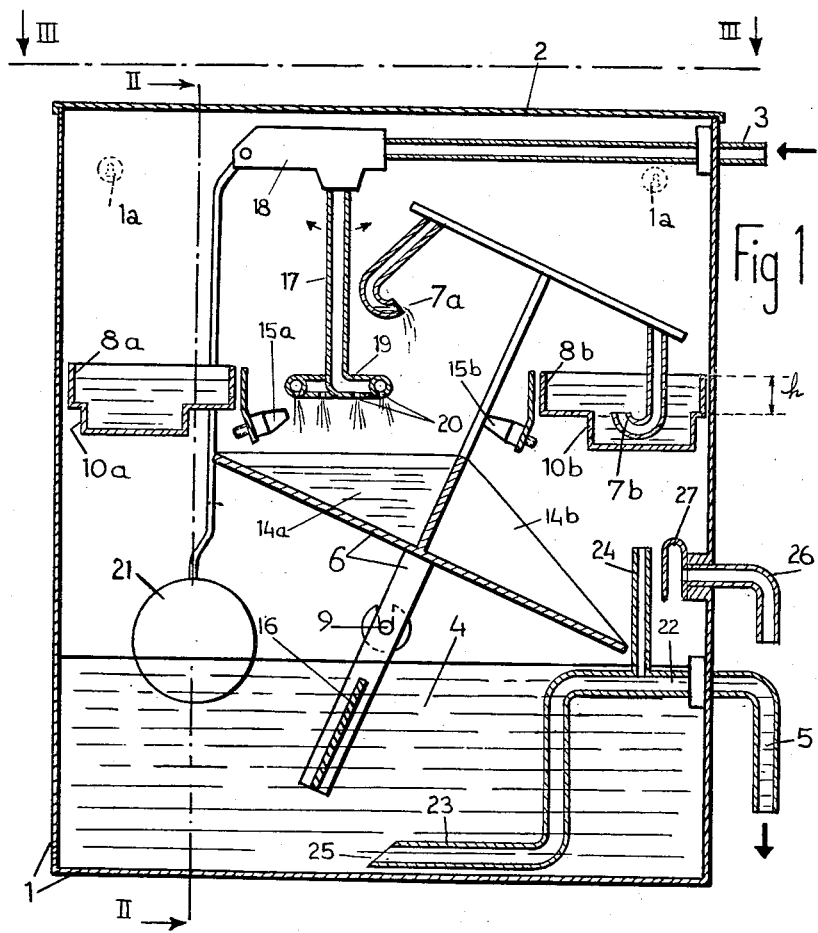
Fig. 1 is a diagrammatic vertical sectional view of an apparatus executed in conformity with various features of the invention, said cross-section being made through line I—I of Fig. 2.

It should be understood of course that these drawings and the corresponding description are given solely by way of exemplification and by no means in a limiting sense.

In the example illustrated, the chief components of the apparatus are all enclosed inside a chamber 1 the walls of which are preferably made of synthetic resin and the bottom portion of which constitutes a vat. This chamber includes means 1a for securing it to a wall. Its upper end is closed by a cover 2 fitted over it.

Inside said chamber, the main liquid which is assumed in the present case to be constituted by running water is admitted through a pipe 3 and it is then admixed with a predetermined proportion of a chemical substance, possibly in a solid state, for instance in the shape of flakes or granules, although said substance is generally liquid and it will in fact be assumed in the present case that said chemical substance is constituted by bleaching water. The sterilized water is then retained for a minimum time at 4 at the bottom of the chamber and it is tapped off for use through a channel 5 as described hereinafter.

The measuring out of the sterilized water is performed by a rocking member 6 designed in a manner well known per se but with various detail improvements now to be disclosed.

One of these features consists in that the rocking member 6 is wholly rigid, except for its carrier spindle while it is preferably made also of a synthetic resin or the like material resisting the even slow corrosive action of ordinary water and of bleaching water. This material may be the same as that forming the chamber walls and be constituted for instance, by polyvinyl chloride, polyethylene or the like.

Said rocking member 6 which will be described in detail hereinafter serves for tapping off the sterilizing water through the incurved pipettes 7a and 7b acting as scoops, ladles or the like, out of the container 8 the parts of which are shown at 8a 8b, 8c. Said container carrying the bleaching water is advantageously executed according to special features of the invention.

Figure 3:
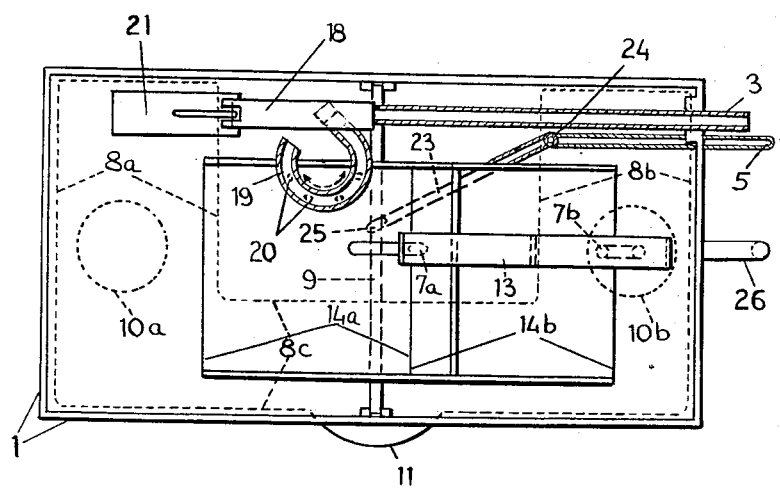
Fig. 3 is a horizontal view of the same apparatus after removal of the cover, said apparatus being seen in the direction of the arrows III—III of Fig. 1.

In the plan view, the container 8 drawn in dotted lines in Fig. 3 is of a general advantageous U-shape with two legs 8a and 8b and a main section 8c. The horizontal area of the container is preferably larger than one half and even three-quarters of the area of the horizontal cross-section of the chamber 1. The main section 8c may be separated if desired into two parts by a partition established for instance in register with the spindle 9 of the rocking member so as to allow mixing with the running water or the like main liquid no longer only one auxiliary liquid, but two different auxiliary liquids, possibly in different proportions. If the first auxiliary liquid is constituted by bleaching water, the second liquid may for instance be constituted by a solution of sodium metaphosphate adapted to soften the water which has been sterilized by the bleaching water.

Such a container for the auxiliary liquid assumes preferably a total height $h$ (Fig. 1) which is much smaller than its breadth and length and in fact it may be smaller than one tenth and even one twentieth of the perimeter of the chamber 1. This allows for a sufficiently large capacity of the container, a substantial reduction in the total height of the apparatus with reference to the height of the apparatus providing the same throughput but of a prior type. Furthermore, this reduction in the total height results in that the apparatus as a whole may be located higher up than hitherto and nearer the ceiling of the room in which it is housed so that the pressure under which the sterilized water or the like treated liquid or liquid mixture obtained is normally increased thereby.

In order that the tapping off pipettes 7a and 7b or the like may however dip to a sufficient extent inside the container 8 in spite of its reduced average height, it is of advantage to provide the latter with two small depressions 10a, 10b (Figs. 1 and 3) which do not increase the total bulk considered vertically.

Inside an apparatus the actual overall sizes of which are as follows: horizontal length 50 cm.—breadth 30 cm.—and height 70 cm.; a height $h$ of the container equal to 5 cm. is sufficient for said container to carry readily 2.5 litres of bleaching water. This allows treating through the so-called chlorinating or verdunizing method 200 cubic meters of water, i.e. providing a throughput of 200 litres of water per hour, which ensures a continuous operation of the apparatus during 1,000 hours without any refilling with bleaching water. When superchlorinating the water with amounts ten times larger than in the case of an ordinary sterilization, it is still possible to treat 20 cubic meters of water without it being necessary to refill the container with bleaching water.

Under said conditions, the refilling may be provided in a very simple manner from the outside of the chamber by pouring the contents of bottles or flasks into the container 8. To make this pouring of liquid easier, said container 8 is provided advantageously, as shown in Figs. 2 and 3, with a section 11 projecting through the wall of the container. It is also preferable to provide an inspection or sighting gate or an optic signal so that the operator may readily ascertain the level of the liquid remaining inside the container. It is then advantageous to associate said inspection gate with the projecting section 11 by forming the latter by means of a transparent material such as that sold under the registered name "Plexiglas," while the remainder of the container is advantageously made of another synthetic resin, for instance that forming the chamber wall and the rocking member 6.

The rocking member will now be described with further details. Said rocking member includes two main sections rigid as already mentioned with its rod or central member 12: the first section includes the pipettes 7a and 7b or the like parts serving for the removal of the bleaching water, said pipettes being secured to a common arm or bracket 13 which is preferably removable with reference to the central rod 12 so as to allow changing the pipettes for pipettes of a different diameter: the rocking member includes further as a second section the two cups or compartments 14a and 14b which are positioned alternatingly during the rocking movement in the path of at least a fraction of the running water entering the apparatus through the pipe 3.

This rocking member 6 is pivotally secured to a spindle 9 or the like part and its rocking stroke is limited by stops 15a and 15h which are advantageously elastic and produce a damping of the rocking movements. The position of these stops is preferably adjustable so as to allow a modification of the limits of the stroke of the rocking member, the maximum angular stroke being advantageously equal to about 60°.

Under such conditions, each time the level of the water fed by the pipe 3 and filling one of the cups in admixture with the chemical substance transferred by the pipette 7a is higher than a predetermined value, the rocking member leaves the extreme position occupied by it and enters the symmetrical position with reference to the vertical plane passing through its rocking axis. If the first position is that illustrated in Fig. 1, the movement produced will be such that the cup 14a pours out, after a rocking movement, the predetermined mixture into the vat at the lower end of the chamber. The pipette 7b pours then into the other cup 14b the desired volume of bleaching water or the like auxiliary liquid or chemical substance. The pipette 7a is now located in a position in which it is adapted to remove a further amount of auxiliary liquid out of the left-hand leg 8a of the container. The cup 14b is in its turn filled with a fraction at least of the water fed through the channel 3, said fraction being then admixed with the auxiliary liquid from the pipette 7b.

In accordance with a further feature of the invention, the rocking member is rigid with a blade, vane or the like extension 16 which dips normally inside the provision 4 of the finished liquid mixture. Said blade acts as a stirrer for this provision of liquid so as to increase its homogeneous character and possibly the efficiency of the treatment, said blade producing simultaneously a very advantageous damping of the rocking movement. Said blade is preferably made of the same synthetic resin as the remainder of the rocking member.

A further improvement resides in the provision of means for adjusting the proportion of the fraction of the main liquid stream entering the channel or pipe 3 and dropping alternatingly into the two cups on the rocking member, with reference to the remainder of the main liquid which drops directly into the vat or container 4. It will be readily ascertained, as a matter of fact, that such an adjustment acts on the final proportion of the mixture which is drawn out through the output channel or pipe 5 without it being necessary to act on the other adjusting means such as the stops 15a, 15b and the pipettes 7a, 7b provided in the apparatus illustrated and the action of which may be however associated with the means considered more particularly at the present stage of the description.

These means for adjusting the fraction of the main liquid stream falling into the cups may be provided in various manners but it seems of a more particular advantage to proceed as follows:

The channel 3 for the input of the main liquid stream is connected inside the chamber with a distributing pipe 17 out of which the liquid escapes under adjustable conditions such that a fraction of the liquid drops into a cup or compartment 14 of the rocking member while the remainder drops directly into the bottom of the chamber forming a vat or container 4 for the treated liquid. The adjustment of the fraction is obtained by providing on a section of the distributing pipe a plurality of ports for the exhaust of the liquid while said section carrying the ports is movable so that a variable number of the latter is directed towards the rocking member while the other ports open directly over the container 4. Said distributing pipe 17 is shown with a vertical section adapted to revolve round its axis with reference to the pipe 3 inside the fluidtight body 18, said section carrying at its lower end a horizontal incurved distributing pipe 19 provided with distributing ports 20. If the number of the latter is equal for instance to 4, a controlled rotation of the distributing pipe 19 with the vertical section 17 as shown by the arrow in Fig. 3, allows various ports to swing into or out of vertical alignment with cups 14a, 14b and thereby permits the passage as required into the rocking member of ¼, ½, ¾ of the totality of the main throughput of liquid and consequently this single adjustment of the angular position of the pipe 19 provides, in the case of only four ports, the possibility of adjusting in a ratio as between 1 and 4 the concentration of the measured chemical substances in the mixture.

The other adjusting means allow readily obtaining a modification as between 1 and 5 of the volume of bleaching water or the like chemical substance poured into one of the cups of the rocking member at each oscillation thereof, either through a modification of the contents of the cups or of the pipettes or sampling nozzles such as 7a, 7b and furthermore it is possible through adjustment of the stops 15a and 15b to adjust within a few percents the amount of liquid producing each rocking oscillation.

It is thus possible through an association of these three adjustments to provide within a large range the proportion of chemical substances incorporated with the main liquid, this being done in an unvarying and accurate manner whatever may be the modifications in the input and output of the apparatus.

As far as the input is concerned, it is of advantage to adjust it as a function of the desired throughput by means of a valve or cock fitted inside the body 18 under control of a float 21 carried by the mixture forming the provision 4 as well known per se. Preferably said float controlled cock is adjusted so that the level of the provision 4 remains permanently between a minimum and a maximum height.

As concerns the output of the liquid under treatment, it is advantageous to resort to various detail improvements which have for their object to ensure the control of said output under conditions as satisfactory as possible as far as the homogeneity and the grade of the treated liquid are concerned.

One of said arrangements consists in tapping off the treated liquid from the lower section of the provision 4, preferably in association with safety means which prevent this tapping off whenever, for any abnormal reason, the level drops underneath the minimum value considered as necessary for a sufficient stirring of the treated liquid and for a sufficient duration of standing of the latter inside the apparatus so that the bleaching water or the like chemical substance may act satisfactorily.

To this end, it is of advantage to design the tapping off and safety means as follows: the output pipe 5 enters the apparatus through a substantially horizontal section located just underneath the minimum level; however the collection of the treated liquid is performed through a section 23 located at the bottom of the provision 4 while an equilibrating and venting pipe 24 of a suitable design is provided for unpriming the syphon thus constituted whenever the level drops underneath the minimum allowed height. Said venting pipe rises above the predetermined maximum level so as to form no undesired passage for the tapping off of liquid through the upper surface of the provision of mixture 4.

As a modification of said unpriming means constituted by a venting pipe rising above the predetermined maximum level, it is possible to locate on the section 22 of the output pipe a very short pipe or connection normally dipping inside the provision 4 but communicating with the latter only through a very narrow port so that in practice the liquid may be removed through the section 23 of the pipe without any substantial passage through said narrow port which forms only an unpriming vent.

According to a still further modification, the safety means considered are provided on the tapping off or output pipe and include means for braking the flow of sterile liquid forming the provision 4, said brake ensuring the maintenance of a minimum level without any unpriming of the syphon in the output circuit or without any carrying along of air through the latter.

Figure 4:
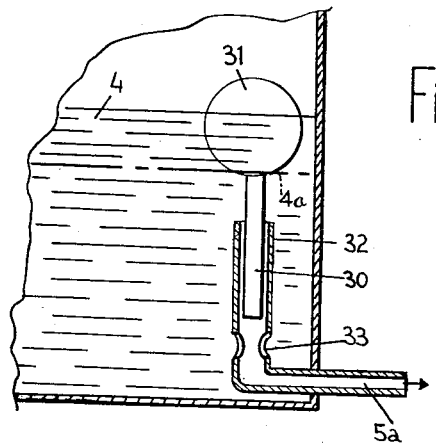
Fig. 4 is a diagrammatic view of a detail modification of a portion of the apparatus according to Fig. 1.

Among the different embodiments of such a brake and manners of operating same, there is illustrated in Fig. 4 an example incorporating a plunger piston 30 which is rigidly secured to a float 31. Said plunger piston engages a vertical section 32 terminating inwardly the output pipe 5a. Said vertical section 32 is provided at a suitable point, preferably near its lower end, with one or more feeding ports 33, which ports are closed wholly or partly when said plunger piston sinks together with the level of the liquid at 4.

The closing provided is furthermore of a gradual character, if desired, so that the amount of sterile water fed through the pipe 5a may be merely reduced when the level of the provision actually sinks and approaches the minimum allowed height which is for instance that illustrated by the dot-and-dash line 4a. The adjustment provided at the start for the throughput depends on the conditions of operation and lies within the possibilities of any one skilled in the art. Possibly also, the operator may modify said adjustment for instance through the agency of preferably graduated means which allow modifying the height of the float 31 with reference to the plunger piston or else through means for adjusting the shape and/or the operative size of the lower end of the plunger piston.

When the level of the liquid 4 to be fed outside the chamber has sunk down to the minimum height to be considered, the plunger piston forming in the present case the output braking member may act in either of two manners according to the circumstances to be considered by the builder, fitter or operator, to wit either the throughput of sterilized water at the output is limited strictly to an amount which is less than or at the utmost equal to the input into the distributing pipe 19, or else a substantially complete stoppage of the throughput is provided.

In all cases, and whenever the invention is applied to an apparatus for sterilizing water and distributing sterile water, the safety means executed in accordance with the embodiment illustrated in Fig. 4 or in a similar manner may be preferred to the arrangements executed in accordance with the precedingly disclosed modifications since it prevents any possible input of air into the output circuit.

It is also possible to still further improve the conditions of the output by setting the end 25 of the collecting pipe section 23 in the vicinity of the center of the bottom of the apparatus.

Further improvements are also possible for the apparatus described such as safety means preventing any exaggerated rising of the level of the provision 4. This arrangement may include very simply an overflow pipe 26, the opening of which is advantageously protected by baffling means 27 against any projection of liquid dropping into the provision 4 (Fig. 1).

Thus the invention provides in all cases apparatus and arrangements for the execution of properly proportioned mixtures of at least one chemical substance with a main stream of liquid, chiefly for water disinfecting purposes, the structure and operation of which apparatus and arrangements appear clearly from the above description, Such apparatus and arrangements provide numerous and substantial advantages and chiefly:

They are readily adaptable for mass production.

They form systems which are readily transportable, positioned and controlled while their aspect is pleasant and rational.

They are sturdy and retain their rigidity and accuracy during their life.

They allow large modifications in the proportion of liquid or the like chemical substances to be measured out.

They are fed in a very simple manner with the auxiliary liquid or the like chemical substances.

Their height is comparatively small and they allow providing a substantial head of treated liquid.

They produce a treated liquid showing normally and in a homogeneous manner the desired properties, this being due in particular to the fact that said liquid remains in the apparatus at least during a sufficient time before it is removed through the output ports.

As already mentioned, the invention is by no means limited to its applications, embodiments and design of its different parts disclosed hereinabove in full detail and it covers all the modifications thereof falling within the scope of the accompanying claims.

What I claim is:

1. An apparatus for incorporating into a stream of a main liquid an adjustable amount of at least one chemical substance, comprising means forming a chamber, an inlet pipe for feeding a stream of main liquid into the chamber, an open-topped container inside the chamber carrying a chemical substance to be incorporated with the main liquid, a rigid rocking bar having two liquid-holding compartments one on each side of the longitudinal axis of the rocking bar, a spindle mounting the rocking bar inside the chamber for rocking about an axis located in the longitudinal axis of the rocking bar, the bottom of said chamber constituting a vat adapted to collect the mixtures formed by the batches from the liquid-holding compartments of said rocking bar, said container including portions located on opposite sides of the longitudinal axis of said rocking bar, two collecting scoops carried by said rocking bar one on each side of its longitudinal axis in position to dip alternately into and remove from the container and to discharge into the compartments predetermined batches of the chemical substance to be added to the liquid in said vat, an extension rigid with the rocking bar and immersed at least partly in the liquid in the vat and adapted to stir the mixtures therein under the action of the oscillation of the rocking bar and to damp said oscillations, means responsive to the liquid level in the vat operatively connected to the inlet pipe to maintain the liquid level in the vat between maximum and minimum levels, the minimum level being a substantial distance above the bottom of the vat, means to deliver liquid from the vat, said liquid delivering means being inoperative when the level of liquid in the vat is below such minimum level and including an intake located adjacent the bottom of the vat at a substantial distance below said minimum level.

2. In a device as claimed in claim 1, the major section of such container lying in the chamber, and extending in an average horizontal plane over more than one-half of the cross-sectional area of the chamber, the average height of said container being smaller than $1/10$ of the horizontal average dimension of said chamber, said container including a small outwardly projecting section provided with an inspection gate for ascertaining the level of liquid in said container.

3. Apparatus as claimed in claim 1 in which said intake is located adjacent the center of the bottom of the vat.

4. In apparatus as claimed in claim 1, a distributing pipe connected to said inlet pipe having adjustable discharge means for adjusting the flow of the stream of main liquid into both of said rocking member and said vat.

5. In apparatus as claimed in claim 1, a vertically arranged distributing pipe connected to said inlet pipe mounted to turn about a vertical axis, and a distributing head at the lower end of said pipe having a plurality of openings therein offset from said axis, whereby turning of said pipe can vary the number of such openings which overlie said compartments.

6. In apparatus as claimed in claim 1, said liquid delivering means including an outlet and a section connecting said intake and said outlet at a level higher than both the inlet and the outlet and located substantially at said minimum level, and a siphon-breaking pipe connected to said section and having an open upper end above said maximum level.

7. In apparatus as claimed in claim 1, the major section of such container lying in the chamber, and extending in an average horizontal plane over more than one-half of the cross-sectional area of the chamber, the average height of said container being smaller than $1/10$ of the horizontal average dimension of said chamber.

8. In apparatus as claimed in claim 1, wherein said liquid delivering means includes an outlet pipe for the vat, adjustable obturating means operatively associated with said outlet pipe for reducing the outflow whenever the liquid in the vat drops below a predetermined level, said outlet pipe extending out of the vat adjacent to the bottom thereof and including an upstanding section provided with an opening in its lower end, and said obturating means comprising a rod fitted slidingly inside said upstanding section, and a float rigid with the upper end of said rod and adapted to shift said rod into a position closing at least partly the opening in said section whenever the level of the mixture carrying the float in the vat sinks to a predetermined minimum height.

References Cited in the file of this patent

UNITED STATES PATENTS

| | | |
|---|---|---|
| 583,786 | Bruun | June 1, 1897 |
| 1,011,317 | Carlton et al. | Dec. 12, 1911 |
| 1,020,915 | Lamb | Mar. 19, 1912 |
| 1,497,701 | Schreier | June 17, 1924 |
| 2,158,558 | Atkins et al. | May 16, 1939 |
| 2,748,076 | Bohannon | May 29, 1956 |

FOREIGN PATENTS

| | | |
|---|---|---|
| 25,016 | Great Britain | Dec. 2, 1905 |
| 4,275 | Great Britain | of 1915 |